(12) United States Patent
He

(10) Patent No.: US 6,650,520 B2
(45) Date of Patent: Nov. 18, 2003

(54) POWER SUPPLY REVERSE BIAS PROTECTION CIRCUIT FOR PROTECTING BOTH ANALOG AND DIGITAL DEVICES COUPLED THERETO

(75) Inventor: Qing He, Gilbert, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 159 days.

(21) Appl. No.: 10/014,722

(22) Filed: Oct. 26, 2001

(65) Prior Publication Data

US 2003/0081365 A1 May 1, 2003

(51) Int. Cl.[7] ................................................ H02H 3/42
(52) U.S. Cl. ........................... 361/84; 361/82; 361/115; 307/127
(58) Field of Search .............................. 361/56, 58, 77, 361/79, 82, 84, 115, 86, 87; 307/10.7, 127, 138

(56) References Cited

U.S. PATENT DOCUMENTS

| | | | |
|---|---|---|---|
| 5,012,381 A | * | 4/1991 | Elliott et al. .................. 361/84 |
| 5,126,911 A | * | 6/1992 | Contiero et al. ............... 361/84 |
| 5,517,379 A | | 5/1996 | Williams et al. |
| 5,539,610 A | | 7/1996 | Williams et al. |
| 5,546,264 A | | 8/1996 | Williamson et al. |
| 5,604,373 A | | 2/1997 | Susak et al. |
| 5,642,251 A | * | 6/1997 | Lebbolo et al. ................ 361/84 |
| 5,645,858 A | * | 7/1997 | Kotwal et al. ............... 424/495 |
| 5,939,863 A | | 8/1999 | Miller |
| 6,043,965 A | * | 3/2000 | Hazelton et al. .............. 361/84 |
| 6,201,427 B1 | | 3/2001 | Osborn et al. |
| 6,529,356 B2 | * | 3/2003 | Chin et al. .................... 361/84 |

FOREIGN PATENT DOCUMENTS

EP          0 629 031          12/1994

* cited by examiner

Primary Examiner—Michael Sherry
Assistant Examiner—Gary L. Laxton
(74) Attorney, Agent, or Firm—Peter Zawilski

(57) ABSTRACT

All integrated circuits (ICs) require a power supply having a potential difference for use in powering internal integrated circuit components to ensure their operation. In some cases it is possible to inadvertently reverse the bias of the applied potential difference, resulting in damage to the IC. For propagating large currents big pass transistors are used within the circuit. Reverse bias protection for these ICs is achieved by utilizing either a protection transistor in parallel with the big pass transistor, or a diode within the big pass transistor for protecting both analog and digital ICs.

12 Claims, 7 Drawing Sheets

POWER SUPPLY REVERSE BIAS PROTECTION CIRCUIT FOR PROTECTING BOTH ANALOG AND DIGITAL DEVICES COUPLED THERETO

FIELD OF THE INVENTION

This invention relates generally to a circuit for protecting a second electronic circuit from reverse bias voltage conditions, and more specifically to a circuit for inhibiting the flow of destructive currents through the second electronic circuit under reverse bias voltage conditions.

BACKGROUND OF THE INVENTION

All integrated circuits (ICs) require a power supply having a potential difference for use in powering internal integrated circuit components to ensure their operation. In some cases it is possible to inadvertently reverse the bias of the applied potential difference. For example in the automotive industry a battery may be connected backwards to a circuit, with the negative supply coupled to the positive power rail, and the positive supply coupled to the negative power rail; without having any form of reverse bias protection between the integrated circuit and the applied potential difference damage could result to the integrated circuits coupled thereto.

Big pass transistors are widely used in IC design to allow for large currents to flow within the integrated circuit. If a reverse bias condition occurs when a power supply is connected backwards to the unprotected IC, damage may result to the IC.

Current methods of reverse bias protection employee current-limiting resistors, diodes or MOS-transistors in series with the big pass transistors. However, the series current-limiting resistors, diodes, or MOS transistors have to pass the same amount of large current as the pass transistor. These components may cause undesired voltage drops.

For instance a known reverse bias protection technique is to place a high current discrete diode in series between the power source and the positive power supply terminal that goes to the ICs requiring protection. As a result reverse voltage from the battery simply reverse biases the diode and protects the ICs. However, the voltage drop on the diode reduces the actual DC voltage available to the IC.

It is also known to use a MOSFET driver between the positive terminal of a device and a positive supply terminal as a high side voltage switch for reverse bias protection. In this arrangement when the MOSFET is conducting a positive voltage is coupled to the positive terminal of the IC., and when the MOSFET is not conducting in the reverse biased condition, it provides reverse battery protection to the IC by shorting the positive supply voltage to ground.

For instanced a Prior Art circuit featuring reverse bias protection is shown in U.S. Pat. No. 5,539,610, Williams et al., and Prior Art FIG. 1. Here a power MOSFET is connected in series with a battery driven load. The MOSFET's gate is driven by a "floating" driver that is connected across the terminals of the battery via a high resistance signal path incapable of high reverse currents. The gate driver contains a device that shorts the gate to the source of the MOSFET, thereby turning it off, if the battery is reversed.

In U.S. Pat. No. 5,517,379, Williams et al., Prior Art FIGS. 2a, 2b, an alternative reverse bias protection technique is shown using a MOSFET coupled to a power source with the drain connected to a load. The gate of the MOSFET is driven by a charge pump control IC in combination with a depletion mode MOSFET. The depletion mode MOSFET is connected across the source and gate terminals of the power MOSFET. When the battery is properly connected, the charge pump biases the gate of the power MOSFET so as to turn it ON, and the depletion mode MOSFET is turned OFF. When the battery is reversed, the depletion mode MOSFET is turned ON which shorts the gate and source of the power MOSFET, thereby turning the power MOSFET OFF.

In yet another U.S. Pat. No. 5,546,264, Williamson, et al—Prior Art FIG. 4—yet another reverse bias protection technique is presented using a MOSFET transistor. The MOSFET source S contact is connected to the positive battery terminal (B+). The drain D contact is connected to the positive input terminal. One end of a resistor 212 is connected to the gate G contact. The other end is connected to a high voltage terminal (B++), where the high voltage is produced by the electronics 204 in a typical manner.

Unfortunately many of these prior art reverse bias protection circuits requires some form of High Side Voltage controller for driving the gate of the MOSFET, or a charge pump circuit to actively bias the MOSFET into conduction by ensuring the gate voltage exceeds the source voltage, and finally a Floating Gate Driver, as well as a Low Side Controller. As a result a number of electrical components are required for this additional circuitry.

There is a need to provide a reverse bias protection circuit for protecting analog and digital integrated circuits, without current-limiting resistors, diodes, MOS-transistors, charge pumps, or high side drivers in addition to the transistors; consequently reducing the number of voltage drops by minimizing the number of components while still ensuring reverse bias protection for the integrated circuit coupled thereto.

SUMMARY OF THE INVENTION

In accordance with the invention there is provided a polarity sensitive electrical circuit for protecting an electrical device coupled thereto from a reverse bias input voltage condition, the electrical circuit comprising:

a positive supply terminal;

a ground terminal;

a first big pass transistor having a bulk, a gate, a source coupled to the positive supply terminal, and a drain resistively coupled to the ground terminal; and a second protection transistor including:

a bulk coupled with the bulk of the first big pass transistor to form a coupled bulk, a source coupled with the positive supply terminal and with the source of the first big pass transistor to form a coupled source, a gate electrically coupled to the ground terminal, and a drain coupled to the coupled bulk and forming a first parasitic diode in a forward bias from the drain of the first big pass transistor to the coupled bulk and a second parasitic diode from the coupled bulk to the coupled source;

wherein when said first big pass transistor is in a conductive state when a voltage is provided across the positive supply terminal and the ground terminal in a first predetermined polarity and wherein said first big pass transistor is in a non-conductive state when a voltage is provided across the positive supply terminal and the ground terminal in a second other predetermined polarity.

In accordance with another aspect of the invention there is provided a polarity sensitive electrical circuit for protecting an electrical device coupled thereto from a reverse bias input voltage condition, the electrical circuit comprising:

a positive supply terminal;

a ground terminal;

a first big pass transistor having a bulk, a gate, a source coupled with the positive supply terminal and a drain resistively coupled with the ground terminal and forming a first parasitic diode in a forward bias from the drain to the bulk; and a protection diode having an anode coupled to the source and a cathode coupled to the bulk of the first big pass transistor;

wherein said big pass transistor is in a conductive state when a voltage is provided across the positive supply terminal and the ground terminal in a first predetermined polarity and wherein current follow through the first big pass transistor is inhibited due to reverse biased current flow through the protection diode.

In accordance with yet another aspect of the invention there is provided a polarity sensitive electrical circuit for protecting an electrical device coupled thereto from a reverse bias input voltage condition, the electrical circuit comprising:

a positive supply terminal;

a ground terminal;

a first big pass transistor having a bulk, a gate, a source coupled to the positive supply terminal and a drain; and a second protection transistor including:

a bulk coupled with the bulk of the first big pass transistor and to the drain of the first big pass transistor to form a coupled bulk, a source coupled with the coupled bulk, a gate resistively coupled to the positive supply terminal, and a drain coupled to the ground terminal;

wherein when said first big pass transistor is in a conductive state when a voltage is provided across the positive supply terminal and the ground terminal in a first predetermined polarity and wherein said first big pass transistor is in a non-conductive state when a voltage is provided across the positive supply terminal and the ground terminal in a second other predetermined polarity.

BRIEF DESCRIPTION OF THE DRAWINGS

The invention will now be described with reference to the drawings in which.

DETAILED DESCRIPTION OF THE INVENTION

The invention will now be described with reference to the following exemplary embodiments.

Using a MOSFET in Reverse Battery Protection Circuit for Big Pass Transistor

When a circuit is forward biased, the positive output of a power supply is coupled to the +VDD terminal and the negative output of the power supply is coupled to the GND terminal. In the case when a circuit is reverse biased the negative output of a power supply is coupled to the +VDD terminal and the positive output of the power supply is coupled to the GND terminal. Of course, for forms of integrated circuit logic requiring different biasing such as ECL, forward bias refers to the power supply being coupled as intended during design and reverse bias refers to the power supply being coupled opposite to that.

Figure 5:
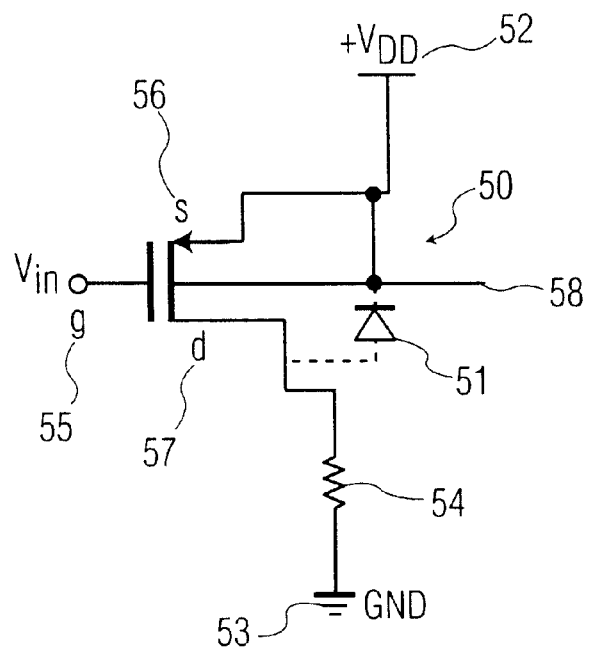
FIG. 5 is a diagram of a big pass transistor having no reverse battery protection with a parasitic diode between the drain and bulk.

In the first embodiment, with reference to FIG. 5, a diagram of a big pass transistor 50 having no reverse battery protection is shown. The big pass transistor 50 in this case is a MOSFET with the source S electrode 56 coupled to +VDD terminal 52. The drain D electrode 57 of the MOSFET 50 is coupled to a load 54, with the load further coupled to a GND terminal 53. A parasitic diode 51 is coupled between the D drain 57 and bulk 58 electrodes of the big pass transistor. An input signal to the gate G electrode 55 of the big pass transistor controls whether current flows from the source S electrode 56 to the drain D electrode 57, providing current through the load 54.

In the circuit shown in FIG. 5, when a reverse bias is applied, the positive power supply output is coupled to GND and the negative power supply output is coupled to +VDD, the parasitic diode 51 between bulk 58 and drain D 57 becomes forward biased and conducts, as a result current passes through this diode and load from GND to bulk through to +VDD possibly damaging the chip.

Figure 6:
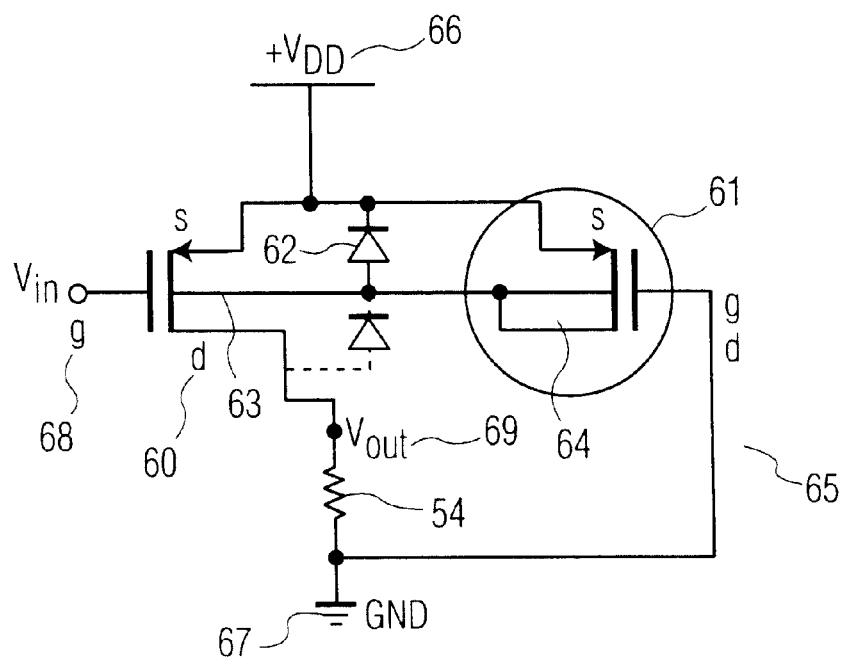
FIG. 6 is a diagram of a big pass transistor having reverse battery protection by the addition of another MOSFET and an additional diode between bulk and source.

A reverse bias power supply protection scheme for the big pass transistor featured in FIG. 5 is shown in FIG. 6. The bulk 63 of a big pass transistor 60 is connected to the bulk 64 of a protection transistor 61. Together the bulks of both transistors 63 64 are connected through a diode to the positive supply terminal, or +VDD terminal 66. The source S electrode of the big pass transistor 60 is connected to the source S electrode of the protection transistor 61 and both sources are connected to +VDD terminal 66. The drain D electrode of the 60 big pass transistor is connected to a load, and the load connected to a GND 67 terminal. The drain D electrode of the protection transistor 61 is connected to the bulk 63 64 of both transistors. The second protection transistor 61 has its gate electrode connected directly to the ground terminal 67.

During normal forward biased operation the big pass transistor 60 is conducting, and the protection transistor 61 is turned off, therefore the same voltage that is available to +VDD 66 is available at the drain of the big pass transistor 60, with a minimal voltage drop through the big pass transistor due to a minimum component count.

During normal forward biased operation the big pass transistor 60 is either conducting or not, depending on the applied gate voltage, and the protection transistor 61 is turned on so the voltage at node 63 is almost equal to VDD 66, minus the few micro-volt voltage drop. Therefore the same voltage that is available to +VDD 66 is available at the drain of the big pass transistor 60, with a minimal voltage drop through the big pass transistor due to a minimum component count.

During reverse biased operation the big pass transistor 60 is not conducting, and the protection transistor 61 is turned on, resulting in the drain of the big pass transistor electrically coupled to ground 67 with a minimal voltage drop through the big pass transistor, thereby protecting an electrical circuit coupled thereto.

During reverse biased operation the big pass transistor 60 is not conducting, and the protection transistor 61 is turned off, the parasitic diode 65 between source and bulk of 61 and bulk and drain of 60 is back-to-back, so negligible current flows from ground 67 to VDD 66, thereby protecting an electrical circuit coupled thereto.

Diode in Reverse Battery Protection Circuit

Figure 7:
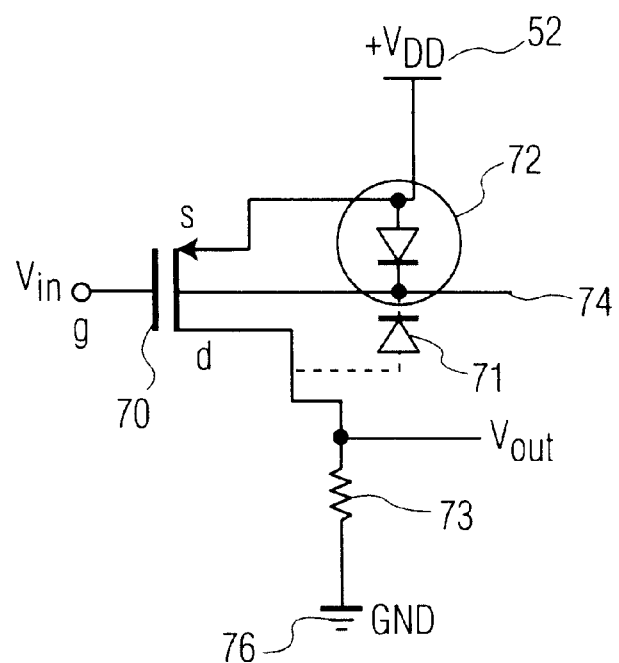
FIG. 7 is a diagram of a big pass transistor having reverse battery protection with the aid of an additional diode between the source and bulk; and, FIG. 8 is a diagram of an electrical circuit providing reverse battery protection for a digital circuit and for an analog circuit.

In the second embodiment, an alternative method of obtaining reverse bias protection for the big pass transistor shown in FIG. 5 is detailed in FIG. 7. The bulk 74 of the big pass transistor 70 is connected through an additional forward biased diode 72 to the source S electrode and to the +VDD terminal 75. The drain D electrode of the big pass transistor 70 is connected to a load 73, and the load 73 connected to a GND terminal 76. A reverse biased parasitic diode 71 is also connected between the drain D electrode the bulk 74 of the transistors. The additional diode 72 and the parasitic diode 71 between the source S and drain D are back-to-back. A load 73 is connected between GND 76 and the drain of the big pass transistor 70.

During normal forward biased operation, upon applying a positive input voltage to the gate G of the big pass transistor 70, the big pass transistor 70 is conducting with essentially the same voltage that is available to +VDD 75, available at the drain of the big pass transistor 70, with a minimal voltage drop through the big pass transistor due to a minimum component count.

During reverse biased operation no current flows through the big pass transistor 70 as a result of the reverse biased additional diode 72. Since no current flows through the big pass transistor 70, no current flows through the load 73 and as a result protecting an electrical circuit coupled thereto.

Battery Protection Circuit Protecting Analog and Digital Circuits

Figure 8:
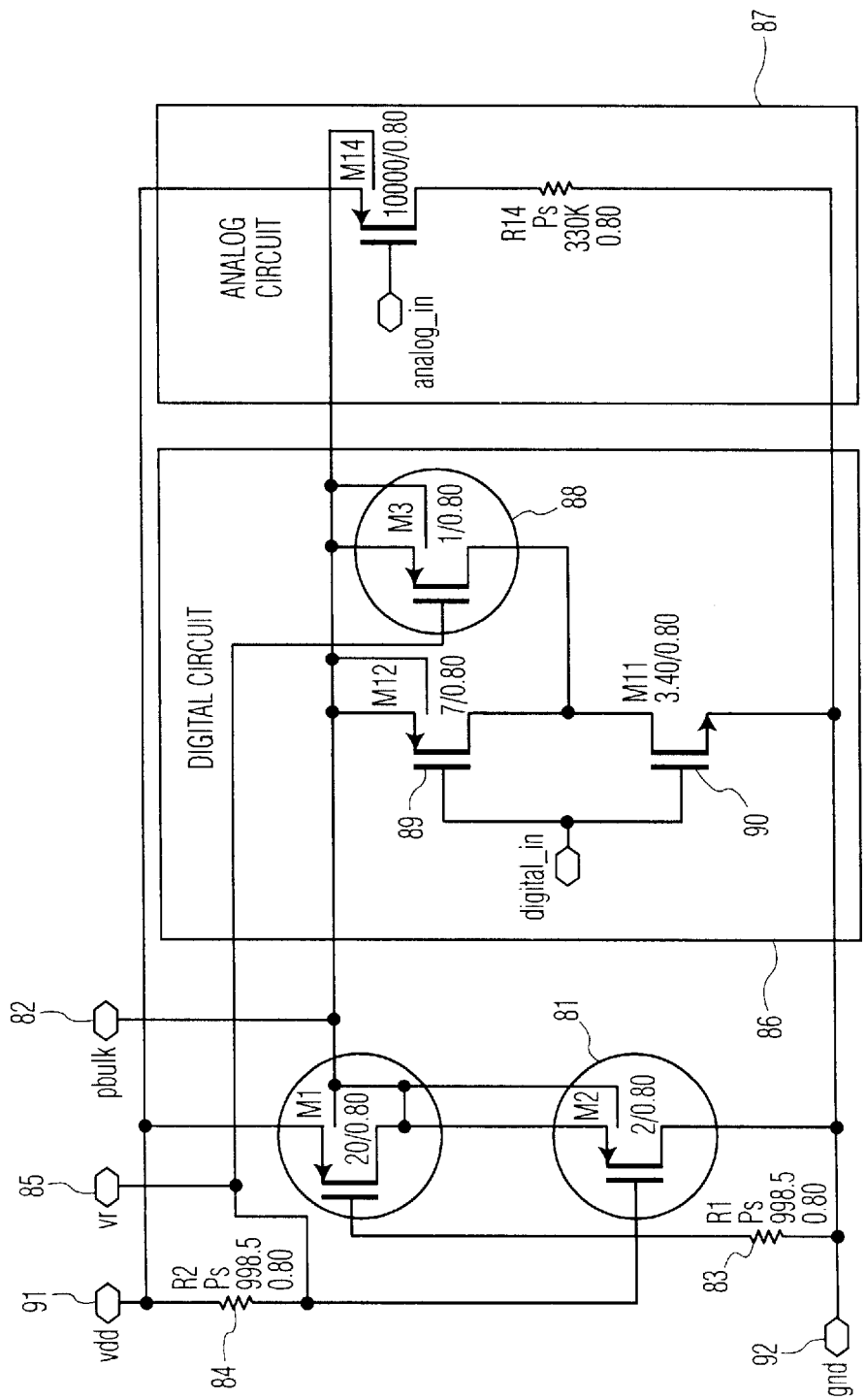

In the preferred embodiment, with reference to FIG. 8, it is possible to protect both analog part circuit and digital part of a circuit without the need for current limiting resistors, diodes or MOS-transistors in series with the protected transistors as described in conventional reverse battery protection methods. Therefore, no voltage drop is realized in the series resistors, diodes or MOS-transistors and as a result the current flow in the protection path is very small and maximum voltage is available to the IC components coupled thereto. During reverse battery operation, the leakage current is also very small and as a result this circuit lends itself ideally for protection of big pass transistor circuits that have large current flow.

The basic parts of the preferred embodiment are 2 PMOS transistors, 80 and 81. The source of the first PMOS (M1) 80 is connected to VDD 91. The bulk and drain of M1 80 are connected to the source and bulk of the second PMOS (M2) 81. This common node is referred as PBULK 82. The gate of M1 80 is connected to ground through a 1 kOhm resistor (R1) 83 and the gate of M2 81 is connected to VDD through a 1 kOhm resistor (R2) 82. The node of the gate of M2 81 is called VR 85.

For the digital part of the circuit 86, the supply voltage from the protection circuit is supplied on the PBULK 82 conductor. The bulk of the two upper PMOS transistors, 88 89, within the digital circuit 86 are connected to PBULK 82. The gate electrode of M3 88 is connected to VR 85. Supply voltage to the PMOS transistors 88 89 in the digital circuit is from the PBULK output terminal. In the analog part of the circuit 87 the supply voltage is still connected to VDD 91 and the bulk of the PMOS transistor is connected to PBULK.

In forward bias circuit operation M1 80 is conducting so the voltage at node PBULK is almost equal to VDD 91, minus the few micro-volt voltage drop. The larger the M1 transistor 80, the small voltage difference between PBULK 82 and VDD 91. PBULK 82 is used to supply voltage for the digital part 86, so the digital circuit 86 will function correctly. The supply of analog part is VDD 91 and its upper PMOS transistors are all connected to PBULK 82, so the analog circuit will function correctly as well.

If the bias of the supply voltage becomes reverse, the 2 PMOS transistors actually act as two back-to-back diodes as reverse bias protection is achieved protecting the circuit because the second PMOS transistor 81 becomes conducting and pulls PBULK 82 to GND 92. As a result both the analog 87 and digital 86 circuits are protected. Within the digital circuit, each upper PMOS transistor 88 89 has the same connection with the upper PMOS, except the gate of M3 88 is connected to VR 85. M3 88 will become conductive at a reverse bias condition and pull the drain of both upper transistors 89 88 to ground. This ensures that all internal nodes of digital circuit have zero voltage during reverse bias operation. For the analog circuit 87 if zero internal node voltage is required then the same transistor as M3 88 is added into this circuit.

Advantageously this improved reverse polarity protection circuit allows for functionality of both analog and digital parts coupled thereto with almost the same operation as with no protection circuitry. This feature is useable in that it makes sure there is no more drop out voltage for LDO. Secondly, the leakage current is very small resulting in all internal nodes having almost zero voltages during a reverse bias condition.

Figure 1:
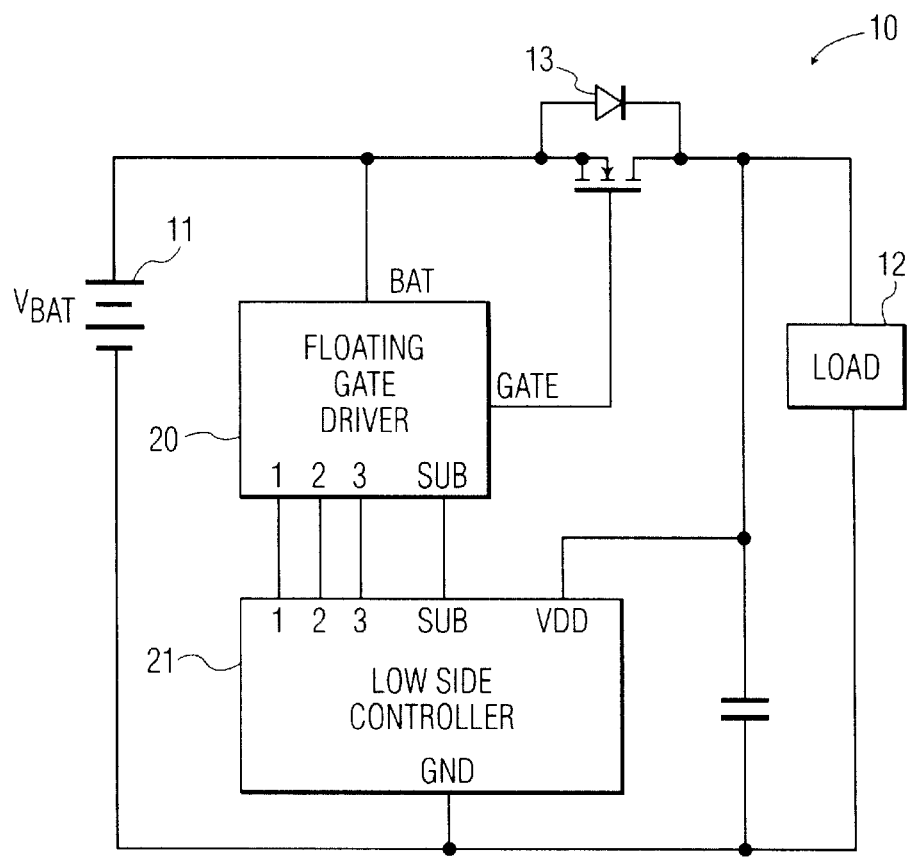
FIG. 1 is a Prior Art diagram of an electrical circuit providing reverse battery protection using a floating gate driver as well as a low side controller.
Figure 2A:
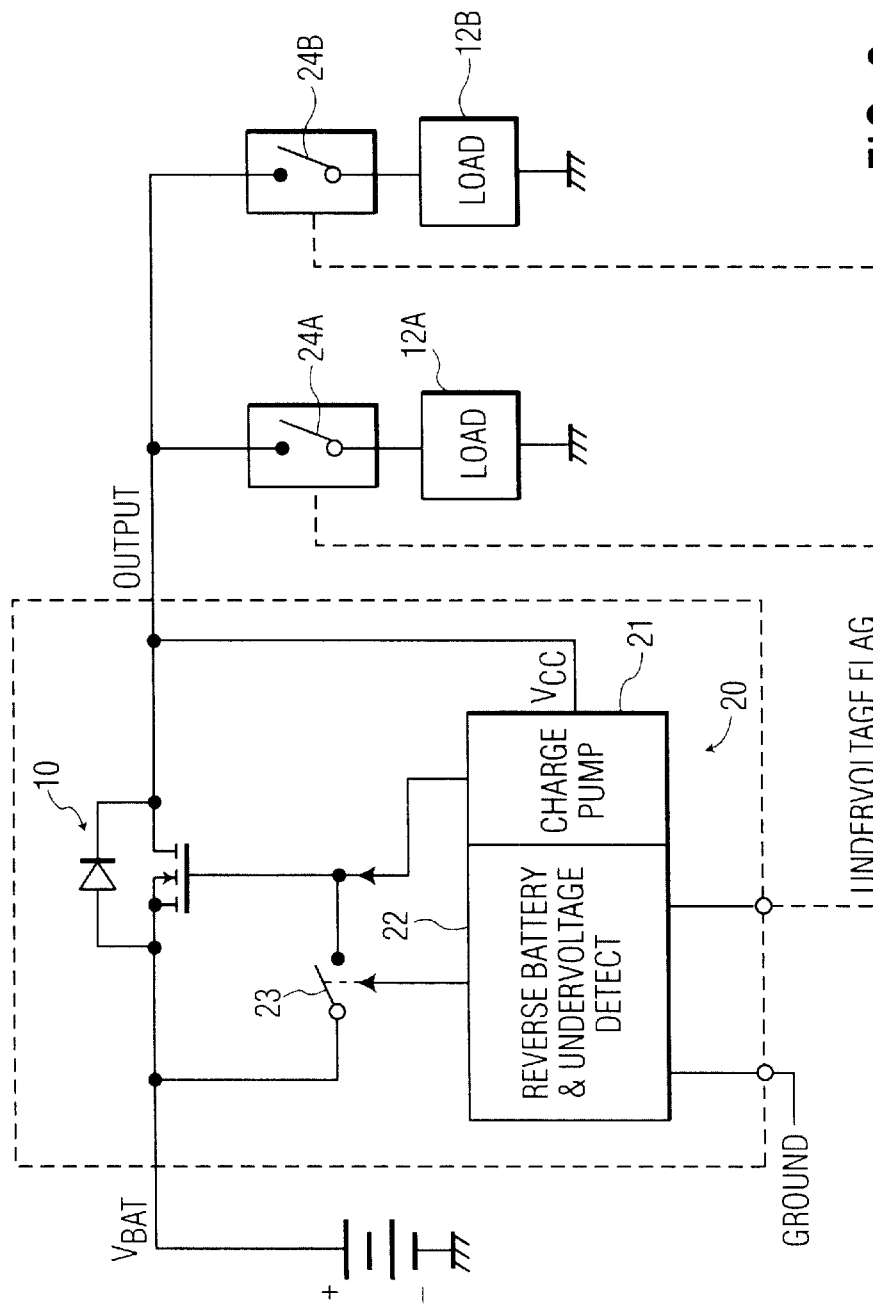
FIGS. 2a, and 2b are of a Prior Art diagram of an electrical circuit providing reverse battery protection using a charge pump and a battery undervoltage detection circuit.
Figure 2B:
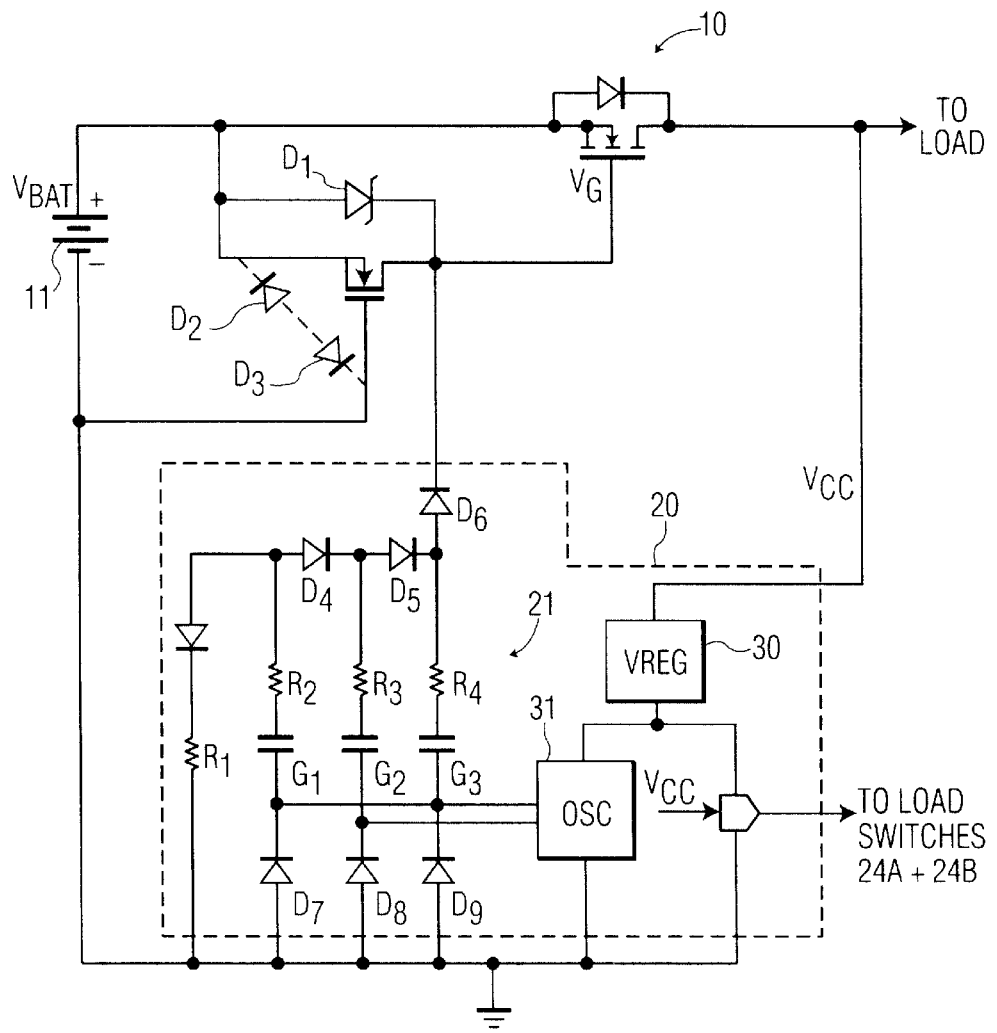
Figure 3:
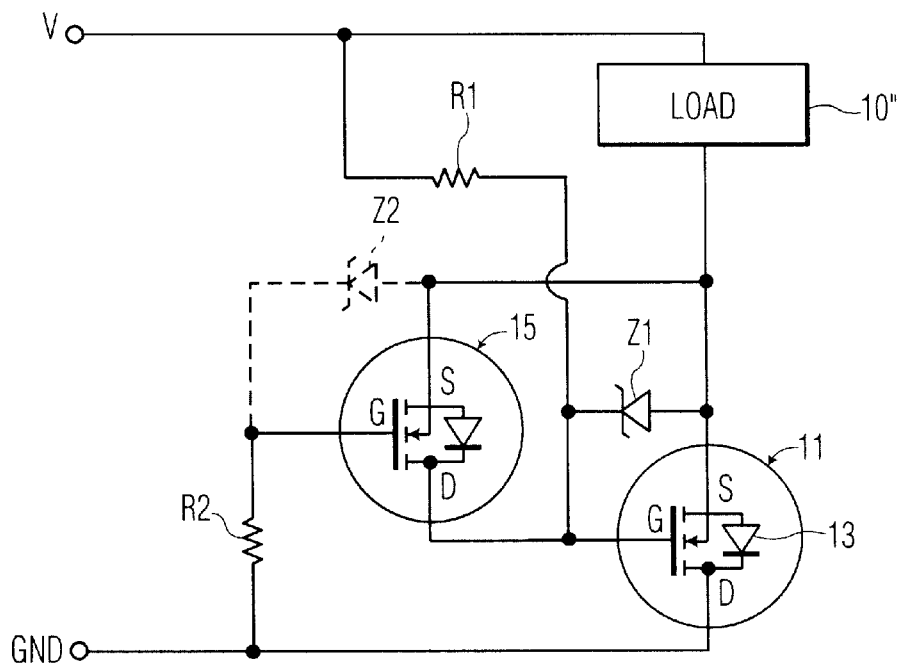
FIG. 3 is a Prior Art diagram of an electrical circuit providing reverse battery protection using two MOS transistors.
Figure 4:
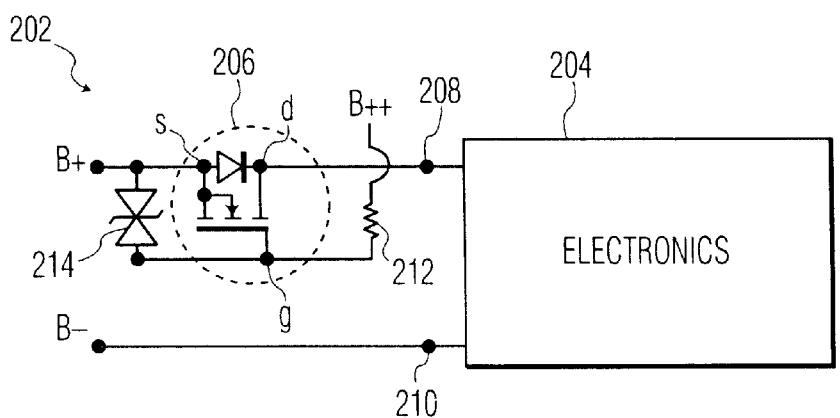
FIG. 4 is a Prior Art diagram of an electrical circuit providing reverse battery protection using a MOS transistors and diodes.

In U.S. Pat. No. 6,043,965, Hazelton et. al., —Prior Art FIG. 3—illustrates a reverse battery protection by using a MOSFET. One terminal coupled to the normally DC voltage supply terminal. The other terminal is coupled to the source S of N-channel MOSFET 11. The drain D of MOSFET 11 is coupled to GND. The parasitic diode is forward biased on MOSFET 11 between source S and drain D contacts. A second MOSFET 15 is coupled into the circuit with its source S coupled to the source of MOSFET 11, its drain D coupled to MOSFET 11 gate, and its gate G coupled through resistor R2 to the drain of MOSFET 11. During reverse battery conditions, R2 causes a larger voltage at the gate of MOSFET 15, which provides a voltage causing current flow via gate G and source S of MOSFET 11.

The configuration of this prior art reverse battery protection circuit is different than that disclosed in the invention, since the invention utilizes fewer components and, the configuration of components in the invention is different than that in the Prior Art.

In the embodiments the transistors used for the invention are P-MOS transistors. However this is not a limitation of the invention and N-MOS transistors or combinations thereof may also be utilized.

Numerous other embodiments may be envisaged without departing from the spirit or scope of the invention.

What is claimed is:

1. A polarity sensitive electrical circuit for protecting an electrical device coupled thereto from a reverse bias input voltage condition, the electrical circuit comprising:
   a positive supply terminal;
   a ground terminal;
   a first big pass transistor having a bulk, a gate, a source coupled to the positive supply terminal, and a drain resistively coupled to the ground terminal; and
   a second protection transistor including:
      a bulk coupled with the bulk of the first big pass transistor to form a coupled bulk,
      a source coupled with the positive supply terminal and with the source of the first big pass transistor to form a coupled source,
      a gate electrically coupled to the ground terminal, and
      a drain coupled to the coupled bulk and forming a first parasitic diode in a forward bias from the drain of the first big pass transistor to the coupled bulk and a second parasitic diode from the coupled bulk to the coupled source;
      wherein when said first big pass transistor is in a conductive state when a voltage is provided across the positive supply terminal and the ground terminal in a first predetermined polarity and wherein said first big pass transistor is in a non-conductive state when a voltage is provided across the positive supply terminal and the ground terminal in a second other predetermined polarity.

2. A polarity sensitive electrical circuit according to claim 1 wherein $V_{in}$ is provided at the gate of the first big pass transistor and $V_{out}$ is provided at the drain.

3. A polarity sensitive electrical circuit according to claim 1 wherein the big pass transistor and the protection transistor are one of a P channel transistor and an N channel transistor.

4. A polarity sensitive electrical circuit for protecting an electrical device coupled thereto from a reverse bias input voltage condition, the electrical circuit comprising:
   a positive supply terminal;
   a ground terminal;
   a first big pass transistor having a bulk, a gate, a source coupled with the positive supply terminal and a drain resistively coupled with the ground terminal and forming a first parasitic diode in a forward bias from the drain to the bulk; and
   a protection diode having an anode coupled to the source and a cathode coupled to the bulk of the first big pass transistor;
   wherein said big pass transistor is in a conductive state when a voltage is provided across the positive supply terminal and the ground terminal in a first predetermined polarity and wherein current follow through the first big pass transistor is inhibited due to reverse biased current flow through the protection diode.

5. A polarity sensitive electrical circuit for protecting an electrical device coupled thereto from a reverse bias input voltage condition, the electrical circuit comprising:
   a positive supply terminal;
   a ground terminal;
   a first big pass transistor having a bulk, a gate, a source coupled to the positive supply terminal and a drain; and
   a second protection transistor including:
      a bulk coupled with the bulk of the first big pass transistor and to the drain of the first big pass transistor to form a coupled bulk,
      a source coupled with the coupled bulk,
      a gate resistively coupled to the positive supply terminal, and
      a drain coupled to the ground terminal;
      wherein when said first big pass transistor is in a conductive state when a voltage is provided across the positive supply terminal and the ground terminal in a first predetermined polarity and wherein said first big pass transistor is in a non-conductive state when a voltage is provided across the positive supply terminal and the ground terminal in a second other predetermined polarity.

6. A polarity sensitive electrical circuit according to claim 5 comprising a digital electronic circuit, the digital electronic circuit having a positive power rail coupled to the bulk of the first big pass transistor.

7. A polarity sensitive electrical circuit according to claim 6 comprising a digital electronic circuit, wherein all internal nodes of digital circuit have zero voltage during reverse bias operation.

8. A polarity sensitive electrical circuit according to claim 5 comprising an analog electronic circuit, wherein an additional transistor is added into the circuit such that all internal nodes of analog circuit have zero voltage during reverse bias operation.

9. A polarity sensitive electrical circuit according to claim 8 comprising an analog electrical circuit for receiving power from both the bulk of the big pass transistor and the positive supply terminal.

10. A polarity sensitive electrical circuit according to claim 5 where the voltage drop through the polarity sensitive electrical circuit is in the order of millivolts.

11. A polarity sensitive electrical circuit according to claim 5 wherein during normal forward biased operation the big pass transistor is is conducting, and the protection transistor is turned off.

12. A polarity sensitive electrical circuit according to claim 5 wherein during reverse biased operation the big pass transistor is turned off, and the protection transistor is conducting.

* * * * *